(12) United States Patent
Engelhart, Sr.

(10) Patent No.: US 8,737,975 B2
(45) Date of Patent: *May 27, 2014

(54) AUDIO-BASED TEXT MESSAGING

(75) Inventor: Robert Lee Engelhart, Sr., Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/636,167

(22) Filed: Dec. 11, 2009

(65) Prior Publication Data
US 2011/0143718 A1 Jun. 16, 2011

(51) Int. Cl.
*H04L 29/08* (2006.01)
(52) U.S. Cl.
USPC ............... 455/414.4; 455/466; 455/412.1; 455/412.2; 379/88.14; 379/100.13; 379/93.15; 379/142.14
(58) Field of Classification Search
USPC ............ 455/466, 412.1, 414.1, 414.4, 413, 455/412.2; 379/88.14, 88.16, 93.15, 379/100.13, 142.14
See application file for complete search history.

(56) References Cited

U.S. PATENT DOCUMENTS

| | | | | |
|---|---|---|---|---|
| 5,644,625 | A * | 7/1997 | Solot | 379/88.22 |
| 7,526,073 | B2 * | 4/2009 | Romeo | 379/88.18 |
| 8,117,268 | B2 * | 2/2012 | Jablokov et al. | 709/206 |
| 2006/0234680 | A1 * | 10/2006 | Doulton | 455/412.1 |
| 2007/0225049 | A1 * | 9/2007 | Andrada | 455/569.1 |
| 2008/0075250 | A1 * | 3/2008 | Kent et al. | 379/133 |
| 2008/0248820 | A1 * | 10/2008 | Lohtia | 455/466 |
| 2009/0196405 | A1 * | 8/2009 | Romeo | 379/88.14 |
| 2010/0158211 | A1 * | 6/2010 | Chatterjee et al. | 379/88.12 |
| 2010/0304768 | A1 | 12/2010 | Murtagh et al. | |
| 2010/0310057 | A1 * | 12/2010 | Theppasandra et al. | 379/88.04 |

OTHER PUBLICATIONS

"Smartphone Centered Architecture," MYCAPTION™ http://www.mycaption.com/resources/tecnnology/architecture, © 2007-2009, accessed Dec. 9, 2009, 2 pages.
"Voice Recognition Software System That Works," MYCAPTION™ http://www.mycaption.com/resources/technology/voice-recognition, © 2007-2009, accessed Dec. 9, 2009, 4 pages.

* cited by examiner

*Primary Examiner* — Khalid Shaheed
(74) *Attorney, Agent, or Firm* — Baker & Hostetler LLP

(57) ABSTRACT

A device that enable users to send and receive a message in different formats may include a text message gateway, an audio message gateway, and a processor. The text message gateway may include a Short Message Service (SMS) gateway. The audio message gateway may include an Interactive Voice Response (IVR) unit and/or a client application interface that receives audio from a client application of a mobile communications device. The processor may be configured to convert text messages received at the text-message gateway into audio messages and then to send the audio messages via the audio message gateway. The processor may also be configured to convert audio messages received at the audio message gateway into text messages and then to send the text messages via the text message gateway.

18 Claims, 6 Drawing Sheets

AUDIO-BASED TEXT MESSAGING

BACKGROUND

Sending and receiving text messages on a mobile communications device requires of the user mental capacity, to formulate or process the meaning of the message, visual capacity, to view the typed or received text, and tactile capacity, to navigate menus and/or type a message. The use of these capacities may be distracting, especially when the user is involved with other activities. For example, when a user is walking, the user may find it difficult to send and receive text messages without being distracted from the activities and other people around him or her.

Audio-based messages, however, require less visual and tactile capacities. A user may leave and listen to voicemails, for example, without excessive typing and without at all visually assessing a screen.

However, under current technology, the receiver of the message and the sender of a message effectively must use the same message format. When a sender chooses to send a message in a text format, the user will generally receive that message in a text format. To illustrate, a user sending a message may choose to telephone the intended recipient. Thus, the format of the message is an audio telephone call for both the sender and the receiver. Alternatively, the user sending a message may choose to record a voicemail and forward the voicemail to the intended user's voicemail box. Again, the message is in an audio format for both the sender and the receiver. Of course, the user sending the message may choose to send a text-based message, such as an e-mail or Short Message Service (SMS) message. Here, the format of the message is text for both the sender and the receiver.

SUMMARY

The methods, devices, and systems disclosed herein enable users to send and receive a message in different formats. An audio-based message may be sent to a recipient as a text-based message, and/or a text-based message may be sent to a recipient as an audio-based message.

A device that enables users to send and receive a message in different formats may include a text message gateway, an audio message gateway, and a processor. The text message gateway may include a Short Message Service (SMS) gateway. The audio message gateway may include an Interactive Voice Response (IVR) unit and/or a client application interface that receives audio from a client application of a mobile communications device. The processor may be configured to convert text messages received at the text-message gateway into audio messages and then to send the audio messages via the audio message gateway. The processor may also be configured to convert audio messages received at the audio message gateway into text messages and then to send the text messages via the text message gateway. The device may be incorporated into a voicemail system, such as a visual voicemail system for example.

DETAILED DESCRIPTION OF ILLUSTRATIVE EMBODIMENTS

Figure 1A:
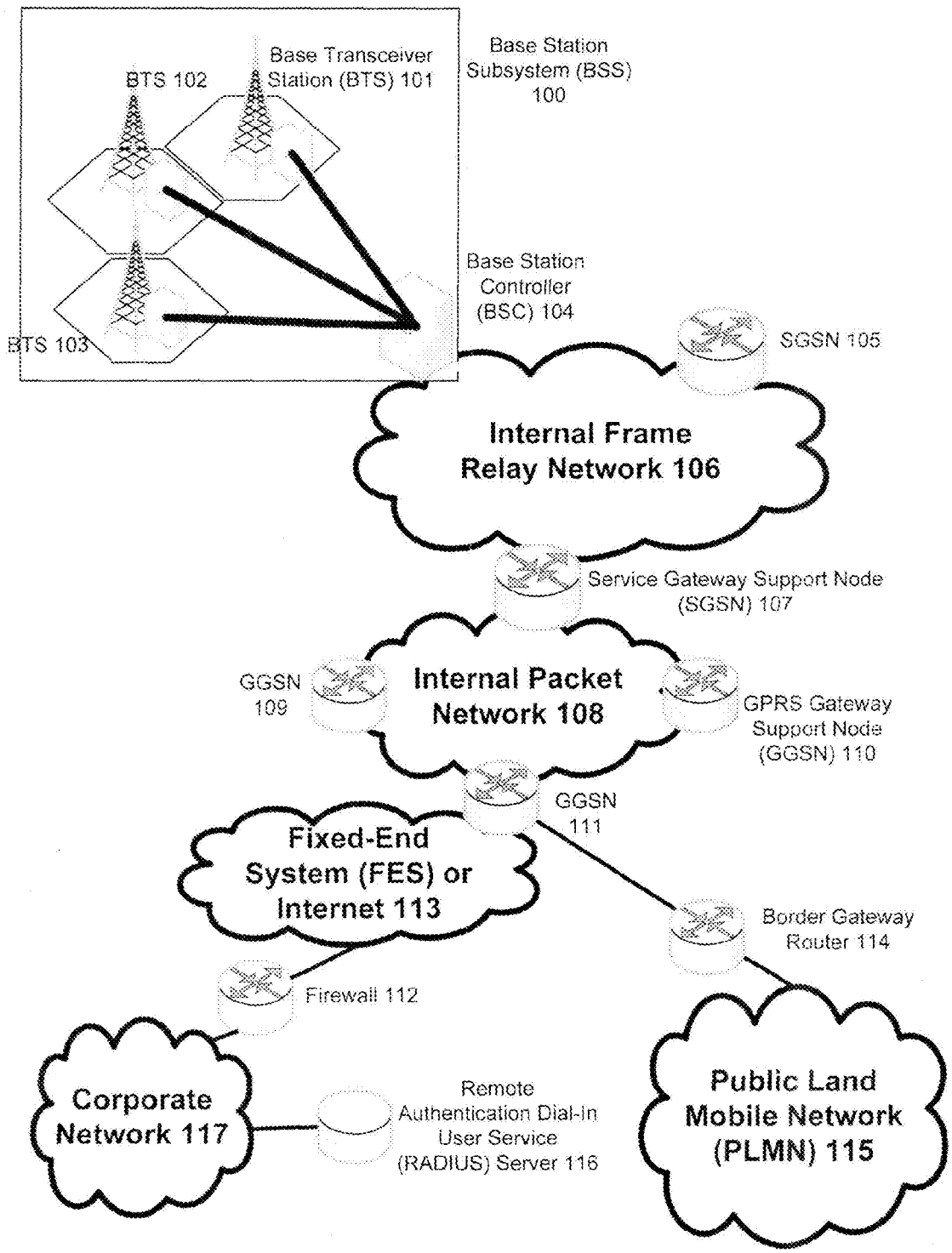
FIGS. 1A-C depict an example wireless network environment an example GPRS network architecture and an example GSM/GPRS/IP multimedia network architecture, respectively.
Figure 1B:
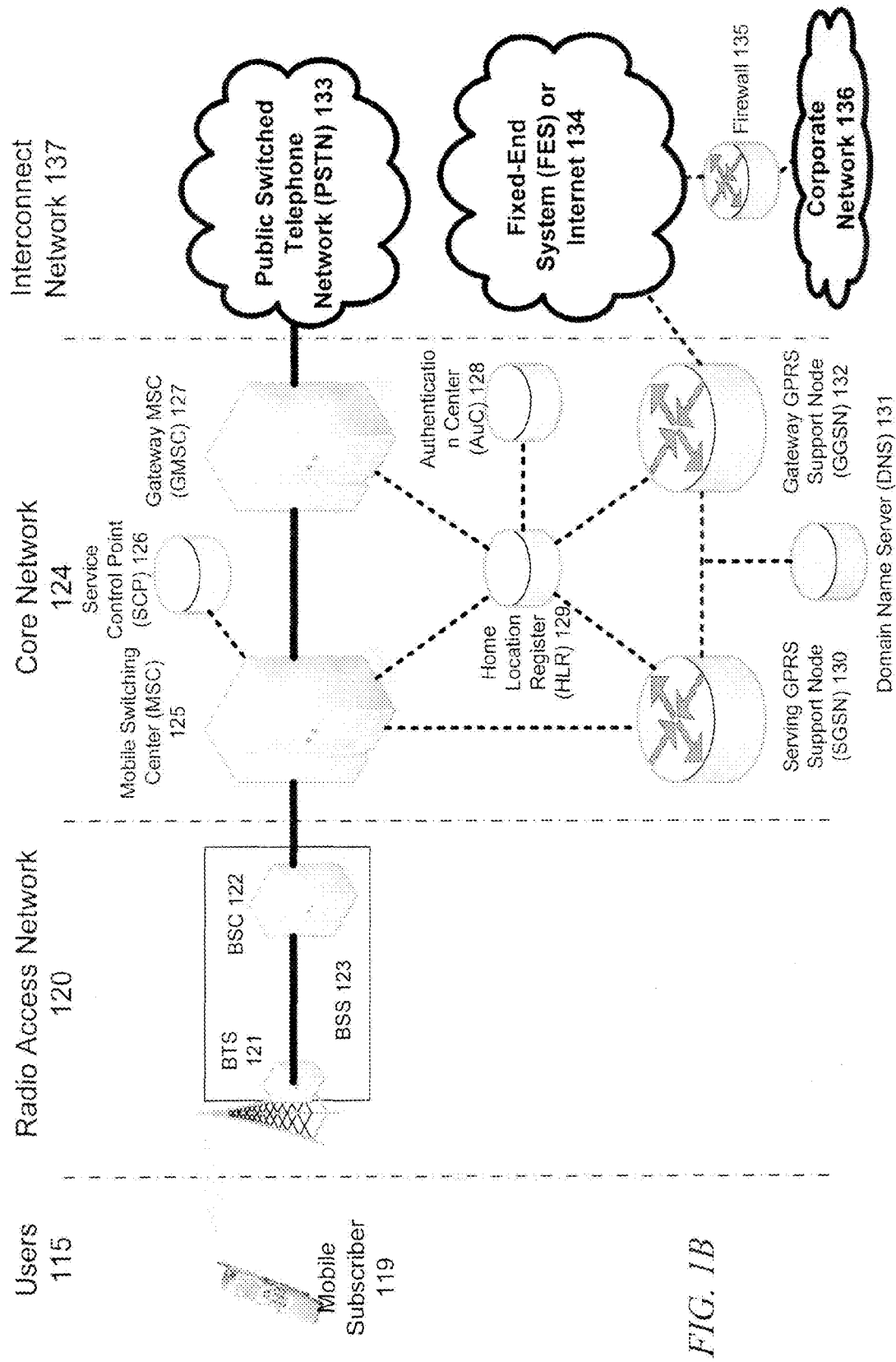
Figure 1C:
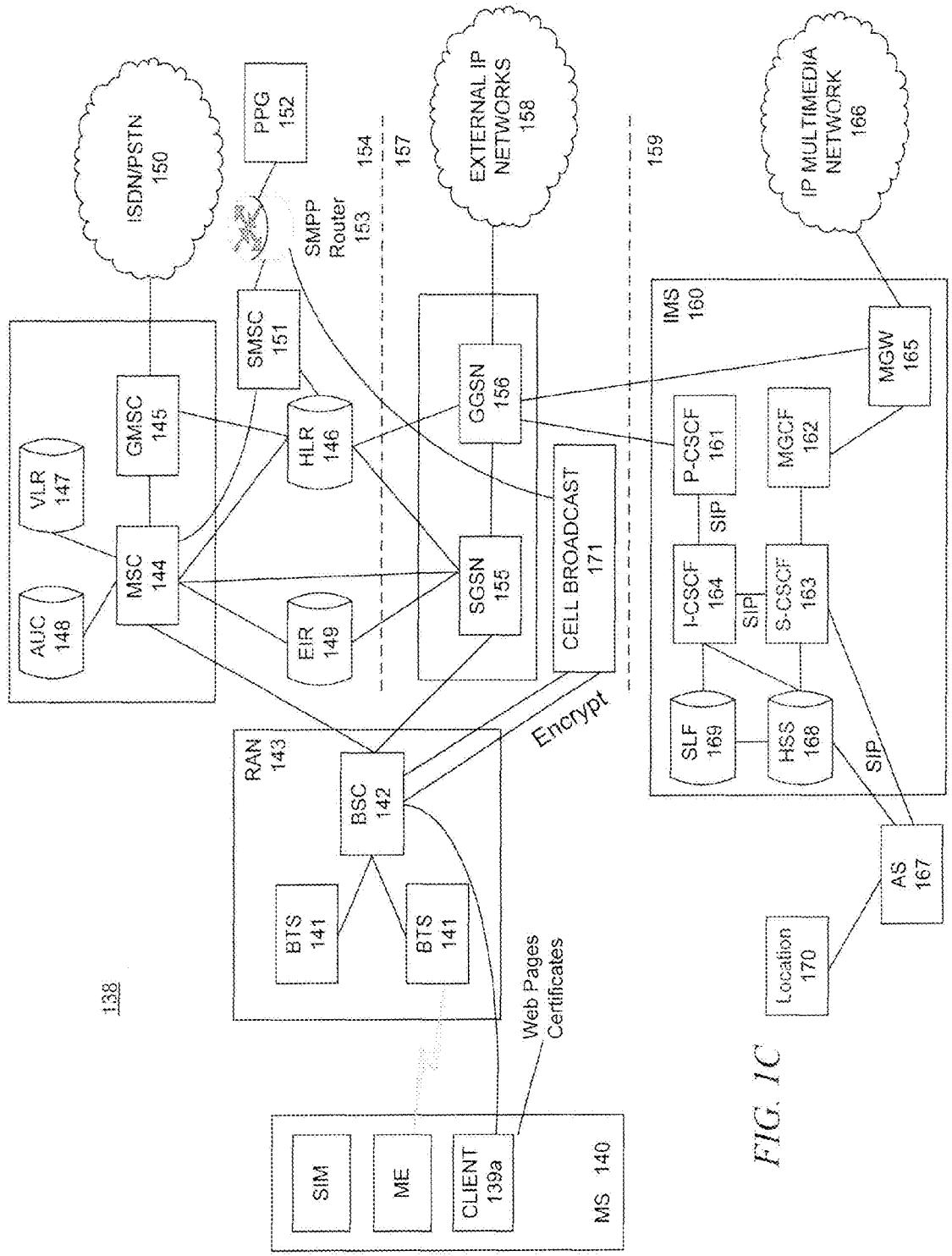

FIGS. 1A-C depict some example telephony radio networks and non-limiting operating environments in which a communications system and processes (such as the system and processes depicted in FIGS. 2-4) may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103. may be the access points where users of packet-based mobile devices become connected to the wireless network. In an embodiment, the packet traffic originating from user devices is transported over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 222, 111, 110, etc.

As illustrated, the SGSN 107 and the GGSNs 222, 111 and 110 may be part of the internal packet network 108. Gateway GPRS serving nodes 222, 111 and 110 may provide an interface to external Internet Protocol ("IP") networks such as Public Land Mobile Network ("PLMN") 115, corporate intranets 117, Fixed-End System ("FES"), the public Internet 113 and/or the like. As illustrated, subscriber corporate network 117 may be connected to the GGSN 111 via a firewall 112; and the PLMN 115 may be connected to the GGSN 111 via a border gateway router 114. A Remote Authentication Dial-In User Service ("RADIUS") server 116 may be used for caller authentication when a user of a mobile cellular device calls corporate network 117, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 115, radio access network 120, core network 124 and interconnect network 137. The users area 115 may include a plurality of end users. The radio access network are 120 may include a plurality of base station subsystems such as the BSSs 123, which include BTSs 121 and BSCs 122. The core network are 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network area 137 also may include networks and network elements. As illustrated in FIG. 1B, the interconnect network are 137 may include a Public Switched Telephone Network ("PSTN") 133, a Fixed-End System ("FES") and/or the Internet 134, a firewall 135 and/or a Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may sends an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

FIG. 1C shows another example block diagram view of a GSM/GPRS/IP multimedia network architecture 138. As illustrated, the architecture 138 of FIG. 1C includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142. The MS 140 may be Mobile Equipment (ME), such as a mobile phone and/or a laptop computer 202c that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTS 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 149, and an Equipment Identity Register (EIR) 148. The MSC 144 may perform a switching function for the network. The MSC may performs other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the mobile subscriber 140. For example, the Push Proxy Gateway (PPG) 152 may be used to "push" (i.e., send without a synchronous request) content to mobile subscriber 102. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first registers with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a cell broadcast and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provides a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provides flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

Figure 2:
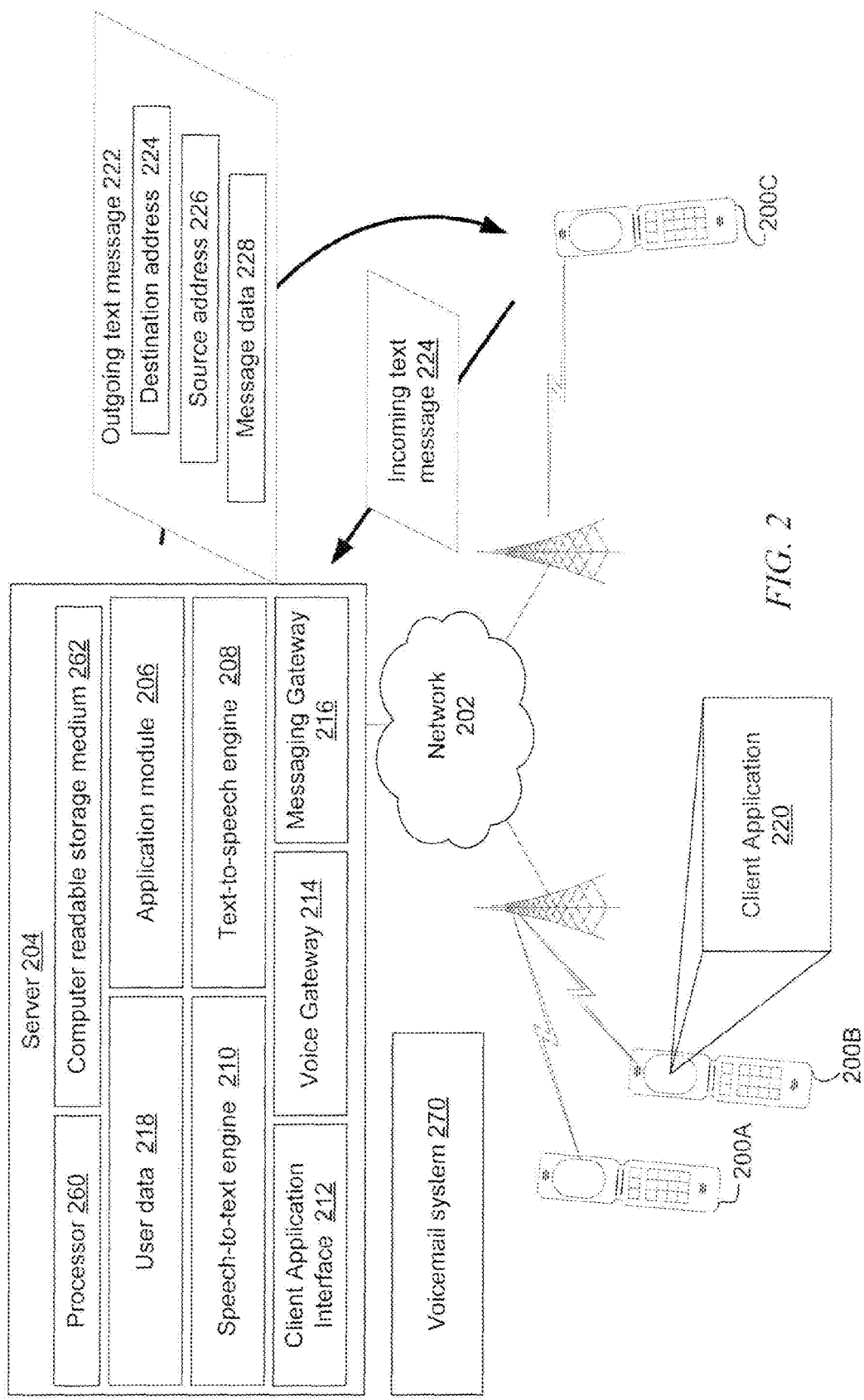
FIG. 2 depicts an example system for sending and receiving messages in different formats.

FIG. 2 depicts an example system for sending and receiving messages in different formats. The system may include one or more mobile communication devices 200A-C. Mobile communication devices 200A-C may include wireless devices such as cellular telephones, Global System for Mobile Communications (GSM) devices, WiFi devices, wireless e-mail devices, and the like. The mobile communications devices 200A-C may communicate with each other via a network 202. The network 202 may include the communication components described above with reference to FIGS. 1A-C. A computing device, such as a server 204, may be connected to the network 202.

The server 204 may convert text-based messages to audio-based messages and audio-based messages to text-based messages for communication between and/or among the mobile communication devices 200A-C.

The server 204 may include a processor 260 and a computer readable storage medium 262. The processor 260 may include any hardware suitable for processing computer logic, such a software and/or machine code. For example, the processor 260 may include an x86 microprocessor or the like. The computer readable storage medium 262 may include any hardware suitable for storing computer logic and/or data. The computer readable storage medium 262 may include a volatile memory, non-volatile memory, and/or a combination of the two. For example, the computer readable storage medium 262 may include Random Access Memory (RAM), Read Only Memory (ROM), magnetic memory, such as a Hard Disk Drive (HDD), flash memory, optical memory, Storage Access Network (SAN), and the like. The computer readable storage medium 262 may include removable media such a optical disks, portable flash and/or hard drives, and the like.

The server 204 may include an application module 206, a text-to-speech engine 208, a speech-to-text engine 210, a client application interface 212, a voice gateway 214, and/or a messaging gateway 216. The server may include user data 218. The user data 218 may be stored in the server's computer readable storage medium 262.

The application module 206 may provide computer logic to coordinate the operation of the server 204. The application module 206 may include computer executable instructions that when executed by the processor 260 direct the operation of the server 204. For example, the application module 206 may be a software module written in computer code and running on the processor 260. The application module 206 may implement the algorithms described herein to control the operation of the server 204. The application module may be stored in the computer readable storage medium 262. The application module 206 may coordinate the operations of the speech-to-text engine 210, the text-to-speech engine 208, the client application interface 212, the voice gateway 214, and/or the messaging gateway 216. The application module 206 may retrieve and/or store user data 218.

The text-to-speech engine 208 may be software, hardware, and a combination of the two suitable for converting text information to audible speech information. The text-to-speech engine 208 may, under the direction of the application module 206, receive text information and process the text information to output an audio file or audio stream of the spoken language audio that represents the inputted text information. The text-to-speech engine may use any technology suitable for converting written text into audible speech, such as concatenative synthesis, unit selection synthesis, diphone synthesis, domain-specific synthesis, formant synthesis, articulatory synthesis, hidden Markov models-based (HMM-based) synthesis, sinewave synthesis, and/or the like.

The speech-to-text engine 210 may receive as an input spoken audio language. The speech-to-text engine 210 may convert the spoken audio language into written text. For example, the speech-to-text engine 210 may include a speech recognition module that processes audio that represents human speech and converts that audio into text. The speech-to-text engine 210 may include any suitable technology for recognizing speech, such as dynamic time warping (DTW)-based speech recognition, hidden Markov models-based (HMM-based) speech recognition, and/or the like. The speech-to-text engine 210 may be shared with a visual voice-mail system, in which voicemails are converted to text for user consumption. The server 204 may be incorporated in to a visual voicemail system to share the speech-to-text engine 210 as a common resource.

The messaging gateway 216 may be a software module, hardware module, a combination of the two suitable for exchanging text-based messages via various messaging protocols. Having the messaging gateway 216 integrated with the server 204 may allow the flexibility of setting the SMSC address in the user's device to the address of the SMS gateway in server 204 and that server 204 may be a totally integrated unit. For example, the messaging gateway 216 may include a Short Message Service (SMS) gateway. The messaging gateway 216 may include protocol interfaces for other text-based messaging protocols, such as instant messaging protocols, mobile instant messaging protocols, e-mail messaging, and the like. The messaging gateway 216 may provide logic suitable for populating, addressing, and properly formatting messages according the appropriate text-based messaging protocols. The messaging gateway 216 may provide logic suitable for engaging in message transfer, acknowledgments, etc. associated with the various text-based messaging protocols. The messaging gateway 216 may provide an Application Programming Interface (API) to the other components of the server 204 for handling internal messaging. For example, the messaging gateway 216 may define a generic text message and address format for internal use. Thus, information according to the generic internal format may be formatted by the messaging gateway 216 into a properly formatted text-message, and likewise, a properly formatted text-message being received by the messaging gateway 216 may be converted to a generic message format and passed to any other component of the server 204.

In an embodiment, the messaging gateway 216 may be part of a separate system or server and may interface with the application module 206 of the server 204 by way of a communication protocols. For example, the messaging gateway 216 may be part of a separate server, distinct from the server 204, and may communicate with the application module 206 over the network 202 via a communications protocol such as Parlay-X Web services. The application module 206 may support an application interface to consumes the service (e.g., web services) the messaging gateway. To illustrate, the application module 206 of the server 204 may send and receive text messages to and from the messaging gateway 216 on another server using the ParlayX Short Messaging Web service interface. Thus, the messaging gateway (e.g., a Parlay-X) may be implemented in the server 204, in another server (such as a voicemail system 270), or as a stand-alone entity.

The voice gateway 214 may include software, hardware and/or a combination of the two suitable for providing Interactive Voice Response (IVR) unit functionality for the server 204. The voice gateway 214 may operate at the direction of the application module 206. For example, the voice gateway 214 may receive telephone calls, make outgoing calls, and while within a call session, provide interactive audio prompts and receive audio information. The voice gateway 214 may receive spoken-word audio and/or dual tone multiple frequency (DTMF) audio. The voice gateway may provide information inputted by a user to the application module 206 and/or to the speech-to-text engine 210 for processing.

The client application interface 212 may provide an interface to a client application 220. The client application 220 may be a software program or application on the mobile communications device 200B. The client application 220 may be stored locally on the mobile communications device 200B and may provide audio prompts, audio recording, and audio messaging functionality. The client application 220 may communicate via the network 202 with the client application interface 212. The client application 220 may provide certain screens and/or user interfaces to the user of the mobile communications device 200B. The client application interface 212 may communicate via a predefined protocol with the client application 220.

The client application interface 212 and the voice gateway 214 may provide similar high-level functionality to a user. Both may receive audio information from the user and both may provide text-based messages in an audio format to the user. For example, the voice gateway provides the user experience through a telephone call to an IVR unit, and the client application interface provides the user experience through a locally installed client application 220 on the mobile communications device 200B itself.

Referring FIG. 2, a user of a mobile communications device 200A-B may wish to send and receive text messages via an audio channel. To illustrate, a user of a mobile communications device 200A-B may wish to send a text message to another mobile communications device 200C by way of an audio channel.

In an embodiment, the mobile communications device 200A may be used to establish a call between the mobile communications device 200A and the voice gateway 214 of server 204. This call may be established via a voicemail system 270 in which the user has a voicemail inbox. The user may login into the voicemail inbox and may indicate the desire to send an outgoing text message. Alternatively, the user may dial a predefined dial and telephone number to create an audio telephone call between the mobile communications device 200A and the voice gateway 214 by way of the network 202.

Once connected to the voice gateway the user of the mobile communications device 200A may hear one or more audio prompts prompting the user for information such as destination telephone number, destination user, and/or the audio message to be communicated. The user may enter the information via spoken word audio which may be passed to the speech-to-text engine 210 and/or via DTMF tones which may be processed by the voice gateway.

In an embodiment, the audio prompts prompting the user for information such as destination telephone number, destination user, and/or the audio message to be communicated may be provided by the client application 220. The user may enter the information via spoken word audio which may be recorded by the client application 220 and passed to the client application interface 212 to be processed.

Regardless of the user interface, the destination may be inputted directly as a spoken or DTMF-entered 10 digit telephone number, e-mail address, and/or instant message user name, for example. The destination may be inputted indirectly via an alias or contact name. For example, the client application 220 may consult a user's contact information stored on the mobile communications device 200B. Alternatively, the inputted information may be passed to the application module 206 which may consider user data 218 stored at the server 204. The user data 218 may include an address book mapping between a name and a destination address for the subscriber. Also, for example, the user data 218 may include a list of frequently messaged users, such that the user of mobile communication device 200A may be prompted with a selection of the most recently or most often texted users to select as the destination address for this particular message.

The user's spoken message data may be passed via the client application interface 212 and/or the voice gateway 214 to the speech-to-text engine 210. The speech-to-text engine 210 may convert the user's audio into text message body. The message body may be passed to the application module 206 which together with the destination information is formatted into a generic text message and passed to the messaging gateway.

The messaging gateway 216 may select an appropriate outgoing protocol for the text message. For example, the messaging gateway 216 may select an SMS protocol for the text message. The messaging gateway 216 may create a properly format the text message 222, populating the destination 224, the source 226, and/or the message data 228. The source 226 may be a telephone number of the sending mobile communications device 200A-B. It may be determined from the device itself, provided via the user data 218, or from anther source within the network 202. The message data 228 may include the text version of the spoken word audio from the user.

The messaging gateway 216 may send the text message 222 by way of the network 202 to the destination mobile communications device 200C. Thus, the user of the mobile communications device 200A-B may send a text message to another mobile communications device 200C by way of a spoken word audio channel. As a result, the user of the mobile communications device 200A-B may limit and/or completely eliminate having to type text messages on the keypad of the mobile communications device 200A-B. Further, because the mobile communications device user 200A-B is using an audio channel, the user may be able to send text messages while engaged in other activities: an advantage that may be particularly enhanced when the user employs a headset.

The messaging protocol described above may be operated in reverse such that incoming text message 224 that is destined for a mobile communications device 200A-B may be processed into an audio format for consumption by the user of the mobile communications device 200A-B. For example, the mobile user of communications device 200C may send a text message 224 destined for mobile communications devices 200A and/or 200B. The text message 224 may include a destination, a source, and a message body.

The incoming message 224 may be intercepted by the server 204 on route to the destination mobile communications device 200A-B. For example, the network 202 may be configured to reroute a destination address of the mobile communications device 200A-B for text message types (such as SMS message types) to the server 204. Alternatively, the text message may be received at the mobile communications device 20A-B and then forwarded, from the client application 220 for example, to the server 204 for processing. The message 224 may be forwarded after it was received by the mobile communications device 200A-B and before it was displayed to the user.

The messaging gateway 216 may receive the incoming message 224. The messaging gateway 216 may parse the message and convert it to a generic text message. This conversion may include stripping away any protocol level information. The generic text message may be passed to the application module 206.

The application module 206 may determine how the user wishes to receive audio information and may look-up source information in the user data 218. For example, the application module may find names associated with the source address of the text message 224 in an address book data of the user data 216. Accordingly, the application module 206 may pass any textual contact names from the address book along with the actual message body text to the text-to-speech engine 208.

The text-to-speech engine 208 may convert the source name, if available, and/or the source destination address into spoken-word audio. The text-to-speech engine 208 may convert the message body text into spoken-word audio. The output of the text-to-speech engine 208 may include an audio file that may be stored and/or passed to the client application interface 212 or the voice gateway 214 to be retrieved or sent to the mobile communications devices 200 A-B. Alternatively, the text may be queued and converted to speech in real-time when requested by the user.

The user may access the audio version of the text message 224. For example, the voice gateway 214 may place an outgoing call to the mobile communications device 200A and may play out the audio message to the user when the user picks up the telephone. Alternatively, the client application interface 212 may send a link to or a copy of an audio file of the spoken text message 224 to the client application 220 of the mobile communications device 200B.

The server 204 may send an indication the mobile communication device 200A-B, via a voicemail system 270. The audio message may stored in the users voicemail inbox and retrieved just as voicemail is retrieved.

In an embodiment, the audio message may be presented in the context of a chat session in which multiple messages are exchanged between two parties. Each message being converted from audio to text or from text to audio as appropriate. From the perspective of the audio interface user, it would appear as a conversation with computer generated audio responses. From the perspective of the text message interface user, it would appear as a common text chat session.

In an embodiment, the server 204 may be incorporated into a voicemail system, such as a visual voicemail system. Audio messages may be presented in the context of a voicemail inbox and users may be given the option to reply, forward, store, and/or delete messages. The chat session interface may be provided as an interface within the voicemail system. Delivery and read receipts may also be provided at the user's request.

Regardless how the user receives or retrieves the audio message, ultimately the text-based message 224 from the mobile communications device 200C is converted by the server 204 into an audio format and available to the mobile communications device 200A-B as an audio message.

Figure 3:
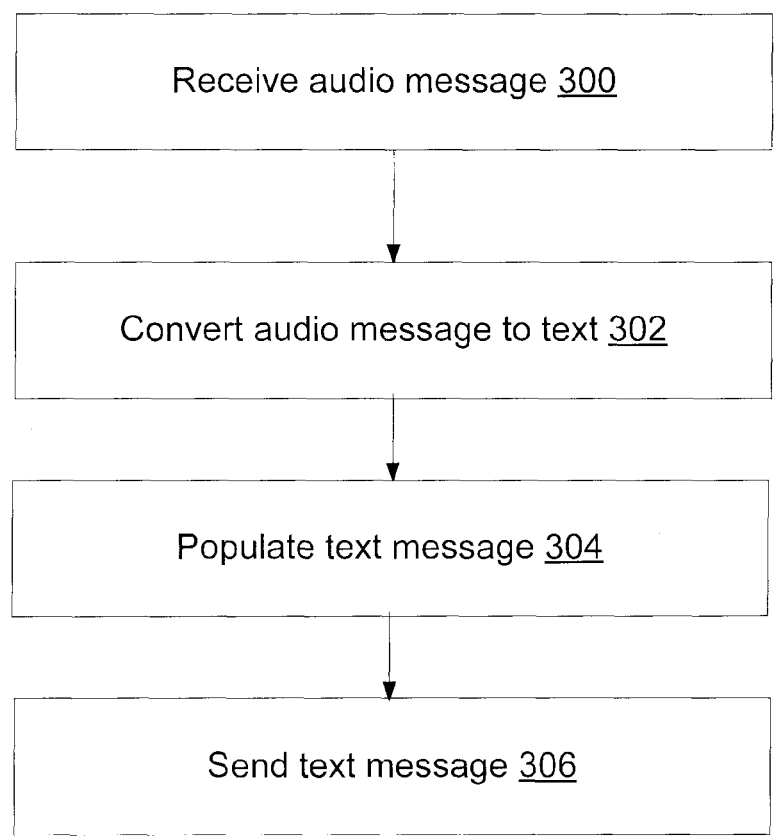
FIG. 3 depicts an example process for converting an audio-based message into a text-based message.

FIG. 3 depicts an example process for converting an audio-based message into a text-based message. At 300, an audio message may be received. The audio message may include an audio-version destination and an audio-version body. The audio message may be received from a mobile communications device. The audio message may be received via a local client application or via an IVR channel At 302, the audio message may be converted to text. Computer processing may be used to convert the spoken audio message into text. Alternatively, the audio message may be sent for human transcription. A combination of computer-assisted and human transcription may be used. The audio-version body may be converted into a text-version body. The audio-version destination may be converted to a destination in text form.

At 304, an text message, such as an SMS message, may be populated for being sent to a destination. The text message may be populated with a destination address as converted in step 302. The text message may be populated with a body as converted in step 302. The text message may be populated with a source that corresponds to the source of the received audio in step 300.

Figure 4:
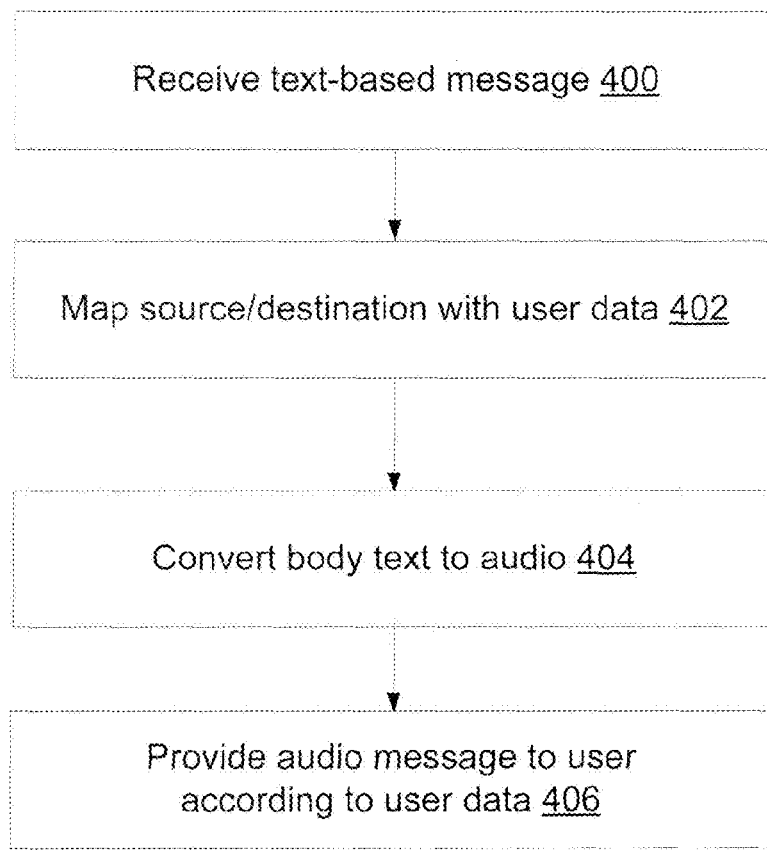
FIG. 4 depicts an example process for converting a text-based message into an audio-based message.

FIG. 4 depicts an example process for receiving a text-based message and converting it to an audio-based message. At 400, the text-based message (such as an SMS message) may be received. For example, the text message may be intercepted at a server in the network. Alternatively, the SMS message may be sent to a destination mobile communications device and forwarded to a server in a network for audio processing.

At 402, the source and/or destination of the text message may be mapped according to user data stored at the server or accessible to the server. The destination number may be mapped to determine the appropriate destination user and the user properties that define characteristics of the conversion to audio and message delivery. For example, the mapping may identify the destination user and determine that the user receives audio messages via a voicemail system.

The source of the received text message also may be mapped according to the user data into a contact name. To illustrate, the incoming text message may have the mobile telephone of a user's mother. In the user data there may be an address book entry that maps the mobile telephone number to a contact named "Mom." Thus, when the text messages is ultimately converted to an audio message, rather than (or in addition to) playing back an audio version of the mobile telephone number, the audio message may include the spoken word audio of the contact name "Mom."

At 404, the source number (and/or source name) and the SMS body text may be converted to an audio message. A text-to-speech synthesis engine may be used to convert the textual data into audio data. The user data may include speech-to-text preferences such as type and/or gender of the output voice, audio playback speed, etc.

At 406, the audio message may be provided to the user according to the user data preferences. For example, the audio message may be sent via a telephone call to the users mobile communications device. Similarly, the user data may indicate that the user has a client application stored locally on his mobile communications device that may receive the audio message for playback to the user. Alternatively, the audio message may be sent to a voicemail system and included in the user's voicemail inbox.

What is claimed:

1. A method comprising:
    receiving, via a client application interface, an audio message comprising an audio-version destination and an audio-version body from a first mobile communications device, wherein:
        the client application interface communicates with a communications device without interaction with an interactive voice response system; and
        the audio-version destination comprises an instant message user name;
    converting the audio message into a Short Message Service (SMS) text message that contains a text-version body that is a translation of the audio-version body, wherein the text message is addressed to a destination that corresponds to the audio-version destination; and
    sending the text message to the destination.

2. The method of claim 1, further comprising establishing a chat session through the voicemail system for sending and receiving multiple messages with a second mobile communications device associated with the destination.

3. The method of claim 1, wherein receiving the audio message comprises receiving the audio message from a client application of the first mobile communications device.

4. The method of claim 1, wherein the converting comprises a machine speech-to-text translating.

5. The method of claim 1, wherein the converting comprises looking-up in a contact list associated with the first mobile communications device a destination mobile telephone number of a contact whose name corresponds to a translation of the audio-version destination, and populating the destination with the destination mobile telephone number.

6. The method of claim 1, wherein the converting comprises converting the audio-version destination into a destination mobile telephone number and populating the destination with the destination mobile telephone number.

7. A device comprising:
    a processor; and
    memory coupled to the processor, the memory comprising executable instructions that when executed by the processor cause the processor to effectuate operations comprising:
        receiving, via a client application interface, an audio message comprising an audio-version destination and an audio-version body from a first mobile communications device, wherein:
            the client application interface communicates with a communications device without interaction with an interactive voice response system; and
            the audio-version destination comprises an instant message user name;
        converting the audio message into a Short Message Service (SMS) text message that contains a text-version body that is a translation of the audio-version body, wherein the text message is addressed to a destination that corresponds to the audio-version destination; and
        sending the text message to the destination.

8. The device of claim 7, the operations further comprising establishing a chat session through the voicemail system for sending and receiving multiple messages with a second mobile communications device associated with the destination.

9. The device of claim 7, wherein the converting comprises machine speech-to-text translating.

10. The device of claim 7, wherein receiving the audio message comprises receiving the audio message from a client application of the first mobile communications device.

11. The device of claim 7, wherein the converting comprises converting the audio-version destination into a destination mobile telephone number and populating the destination with the destination mobile telephone number.

12. The device of claim 7, the operations further comprising rerouting a destination address.

13. The device of claim 7, wherein the converting comprises looking-up in a contact list associated with the first mobile communications device a destination mobile telephone number of a contact whose name corresponds to a translation of the audio-version destination, and populating the destination with the destination mobile telephone number.

14. A computer-readable storage medium that is not a propagating signal, the computer-readable medium comprising executable instructions that when executed by a processor cause the processor to effectuation operations comprising:
    receiving, via a client application interface, an audio message comprising an audio-version destination and an audio-version body from a first mobile communications device, wherein:
        the client application interface communicates with a communications device without interaction with an interactive voice response system;
        the audio-version destination comprises an instant message user name;
    converting the audio message into a Short Message Service (SMS) text message that contains a text-version body that is a translation of the audio-version body, wherein the text message is addressed to a destination that corresponds to the audio-version destination; and
    sending the text message to the destination.

15. The computer-readable storage medium that is not a propagating signal of claim 14, wherein the converting comprises converting the audio-version destination into a destination mobile telephone number and populating the destination with the destination mobile telephone number.

16. The computer-readable storage medium that is not a propagating signal of claim 14, the operations further comprising establishing a chat session through the voicemail system for sending and receiving multiple messages with a second mobile communications device associated with the destination.

17. The computer-readable storage medium that is not a propagating signal of claim 14, wherein the converting comprises looking-up in a contact list associated with the first mobile communications device a destination mobile telephone number of a contact whose name corresponds to a translation of the audio-version destination, and populating the destination with the destination mobile telephone number.

18. The computer-readable storage medium that is not a propagating signal of claim 14, wherein receiving the audio message comprises receiving the audio message from a client application of the first mobile communications device.

* * * * *